(12) United States Patent
Nakano et al.

(10) Patent No.: US 7,647,825 B2
(45) Date of Patent: Jan. 19, 2010

(54) THERMAL TYPE FLOWMETER

(75) Inventors: Hiroshi Nakano, Hitachi (JP);
Masahiro Matsumoto, Hitachi (JP);
Keiji Hanzawa, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/339,485

(22) Filed: Dec. 19, 2008

(65) Prior Publication Data

US 2009/0241660 A1    Oct. 1, 2009

(30) Foreign Application Priority Data

Mar. 31, 2008 (JP) ............................. 2008-089157

(51) Int. Cl.
*G01F 1/68* (2006.01)
(52) U.S. Cl. .................................... 73/204.26
(58) Field of Classification Search .............. 73/204.26, 73/204.24, 204.25

See application file for complete search history.

(56) References Cited

U.S. PATENT DOCUMENTS

| | | | |
|---|---|---|---|
| 6,769,298 B2* | 8/2004 | Matsumura et al. | 73/204.15 |
| 6,912,899 B2* | 7/2005 | Satou et al. | 73/204.22 |
| 7,059,183 B2* | 6/2006 | Kikawa et al. | 73/202.5 |

FOREIGN PATENT DOCUMENTS

JP    2000-146652 A    5/2000

* cited by examiner

*Primary Examiner*—Jewel Thompson
(74) *Attorney, Agent, or Firm*—Crowell & Moring LLP

(57) ABSTRACT

In the thermal type flowmeter for measuring the flow rate by a measuring element with an exothermic resistor and a temperature measuring resistor being shaped in the side of the surface of a substrate, a facing wall facing the surface of the measuring element is arranged, cantilever plate parts protruding from the facing wall toward the measuring element side are arranged, a gap is provided between the tip of the cantilever plate parts and the measuring element, and the cantilever plate parts are extended from the upper stream to the down stream of the measuring element.

11 Claims, 11 Drawing Sheets

THERMAL TYPE FLOWMETER

BACKGROUND OF THE INVENTION

1. Field of the Invention

The present invention relates to a thermal type flowmeter for measuring flow rate with a heat-generating resistor being arranged in the fluid to be measured, more specifically, relates to measurement of the intake air flow rate and the exhaust gas flow rate of an internal combustion engine of an automobile.

2. Description of the Related Art

With respect to a flow rate sensor for detecting intake air volume of an internal combustion engine for an automobile and the like, a thermal type air flow rate sensor capable of direct measuring of mass flow amounts has been mainly in use.

In recent years, one wherein a sensor element of a thermal type flowmeter is manufactured using micro machine technology on a semiconductor substrate such as silicon (Si) has been proposed. In such a thermal type flowmeter of a semiconductor type, a heat generating resisting body is shaped in a thin film part of several microns shaped in the semiconductor substrate. As it is a thin film, the heat capacity is small, and a quick response and low power consumption are possible. Further, it is easy to shape construction by micro-fabrication to detect the temperature difference of the down-stream and the up-stream of the heat generating resisting body and to judge following current/reverse current.

With respect to the conventional technology of the thermal type flowmeter of the type described above, there is one described in the Patent Document 1.

(Patent Document 1) The Japanese Unexamined Patent Publication No. 2000-146652

For example, in detecting intake air flow rate of an internal combustion engine for an automobile, water droplets mixed in the intake air are attached to a flow rate detecting element and measuring error occurs. Particularly, in the thermal type flowmeter of a semiconductor type, because the detecting part is of a thin film, the heat capacity is small, therefore, if the water droplets are attached to the heat generating part, the temperature of a thin film part lowers sharply, and measuring of the flow rate may become impossible. Further, by attachment of the water droplets, the thin film part is cooled rapidly and the measuring element may possibly be destroyed.

In the conventional technology, flow rectifying blades are shaped integrally with a sensor element. If the water droplets fly in to the thermal type flowmeter of such construction, the water droplets are trapped by the rectifying blades once, crawl along the side face of a flow rectifying member by the wind pressure, and thereafter, may possibly separate from the flow rectifying blades and attach to the resistance body shaped region of the measuring element. In the conventional technology, the problem on attachment of water droplets has been left.

SUMMARY OF THE INVENTION

The present invention has been developed under consideration of the points described above, and is to provide a thermal type flowmeter wherein attachment of the water droplets and liquid fouling matter which have flied in to the measuring element is prevented.

The problems described above can be solved by the constitution described below.

In the thermal type flowmeter wherein a flow rate is measured by arranging the measuring element with an exothermic resistor and a temperature measuring resistor being shaped on its surface side is arranged within the fluid passage, cantilever plate parts protruding from a wall face of the fluid passage opposing to the surface of the measuring element toward the measuring element side are arranged, and the cantilever plate parts are extended from the upper stream to the down stream of the measuring element. Here, the wall face opposing to the surface of the measuring element is to support the cantilever plate parts and may be constructed integrally with the wall face. In addition, the tip part of the cantilever plate parts (opposite side of the supporting part) is apart from the measuring element by a predetermined distance to form a gap.

In this regard, it is also possible to support the measuring element by a support member opposing to the wall face described above, to dispose the support member so that channels where fluid flows are constituted respectively between a first wall face and the support member and between a second wall face opposing to the first wall face and the support member constituting the fluid passage and so that the measuring element opposes to the first wall face, to make the cantilever plate parts protrude from the second wall face toward the support member, to arrange a gap between the tip part of the cantilever plate parts and the support member, and to make the cantilever plates extend from the upper stream to the down stream of the measuring element.

Also, the cantilever plate parts can be shaped by arranging in the plural in the direction of the face of the measuring element and the direction generally perpendicular to the axis of the fluid channel.

Also, it is possible to arrange plate-like parts extended from the wall face side described above to the measuring element side or the support member side beyond the tip part of the cantilever plate parts in the upstream side and the downstream side of the measuring element.

Also, the plate-like parts can constitute both-end supported plate parts supported by the wall face and the support member.

Also, the cantilever plate parts and the plate-like plate parts can form generally continuous faces.

Also, it is possible to shape guide parts of a projected or recessed shape which head from the measuring element side to the wall face side as they go close to the measuring element, in the side faces of the plate-like parts.

Or alternately, it is possible to shape guide parts of a projected or recessed shape which head from the support member side to the second wall face side as they go close to the support member, in the side faces of the plate-like parts.

Also, the plate thickness of the tip part of the cantilever plate parts can be shaped thinner than the plate thickness of the roots.

Further, when the interval from the tip part of the cantilever plate parts to the measuring element is made G and the interval between the tip parts of a plurality of the cantilever plate parts is made D, it is possible to have a portion wherein the relation between the interval G and the interval D becomes G>D.

Furthermore, it is possible that the fluid passage shapes a sub-passage to which a portion of the fluid of the main passage where the fluid to be measured flows is taken, that a straight part where the channel is straight and, in the upper stream and the down stream of the straight part, curved parts where the channel is curved are provided within the subpassage, and that the measuring element is arranged in the straight part.

BRIEF DESCRIPTION OF THE DRAWINGS

Embodiment(s) of the present invention will be described in detail based on the following figures, wherein.

DESCRIPTION OF THE PREFERRED EMBODIMENTS

Embodiments in relation with the present invention will be described below.

First Embodiment

The first embodiment will be described below.

Figure 1A:
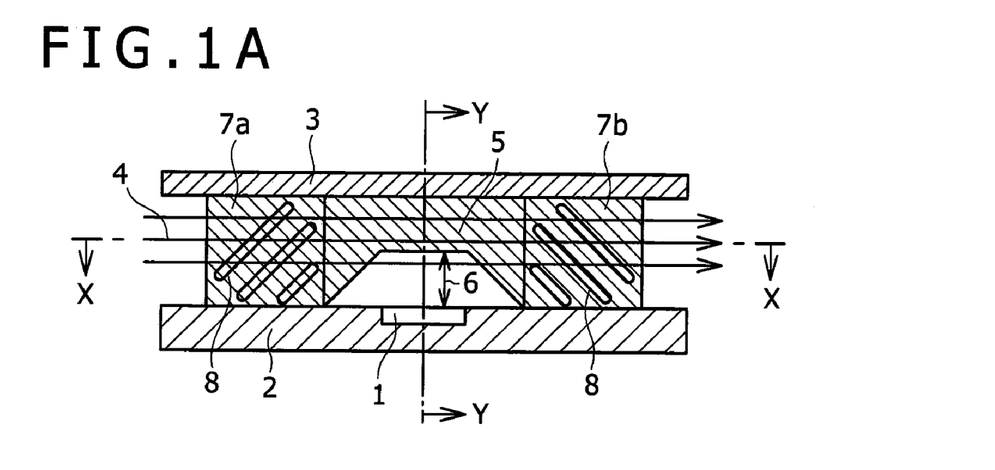
FIG. 1 is a drawing showing the periphery of a sensor element in the first embodiment.
Figure 1B:
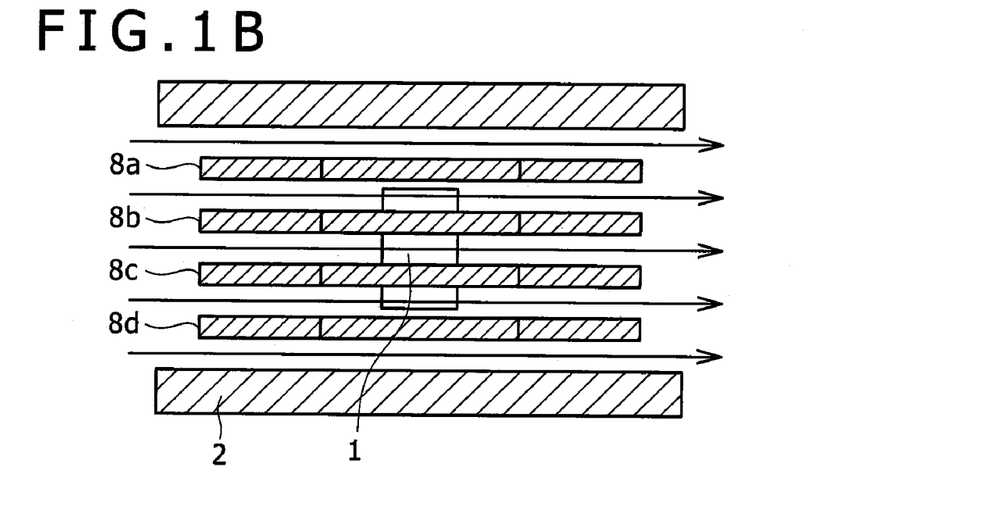
Figure 1C:
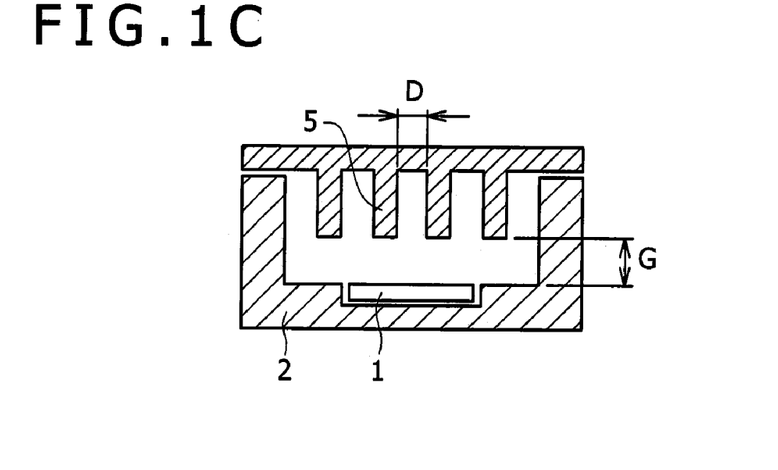

FIG. 1 (*a*) is a cross-sectional view of the section where a measuring element 1 is arranged. Also, FIG. 1 (*b*) is a cross-sectional view at X-X line in FIG. 1 (*a*), and FIG. 1 (*c*) is a cross-sectional view at Y-Y line in FIG. 1 (*a*). The measuring element 1 is arranged in a groove of a rectangular shape formed in a support member 2. Further, facing the support member 2, a facing wall 3 is shaped. Air flow 4, the object of measuring, flows between these support member 2 and the facing wall 3.

In the facing wall 3 facing the measuring element 1, cantilever plate parts 5 protruding from the facing wall 3 are shaped. A gap 6 is arranged between the tip part of the cantilever plate parts 5 and the measuring element 1. As shown in FIG. 1 (*c*), if the facing wall 3 and the cantilever plate parts 5 are integrally formed by a resin such as PBT, the manufacturing process can be simplified. The cantilever plate parts 5 are extended from the upstream side end to the downstream side end of the measuring element 1. As shown in FIG. 1 (*c*), the cantilever plate parts 5 are disposed in the plural in the direction perpendicular to the flowing direction of the air flow 4. Here, when the gap between the tip part of the cantilever plate parts 5 and the surface of the measuring element 1 is made G and the interval for disposing the cantilever plate parts 5 in parallel is made D, it is preferable to become G>D.

In this regard, the value of G is approximately 1 mm, and if it is made smaller than this, water droplets are attached so as to bridge between the tip part of the cantilever plate parts 5 and the surface of the measuring element 1.

Further, in the upstream side of the measuring element 1, both-end supported plate parts 7*a* protruding from the facing wall 3 are formed. This both-end supported plate parts 7*a* constitute plate-like parts extended beyond the tip part of the cantilever plate parts 5 to the measuring element 1 side. If the portion of the both-end supported plate parts 7*a* is formed integrally with the facing wall 3, the manufacturing process can be simplified. In this case, the root parts of the both-end supported plate parts 7*a* become the facing wall 3, and the tip parts either contact the support member 2 or are adhered by an adhesive. Or alternatively, the both-end supported plate parts 7*a* and the support member 2 are integrally formed. In this case, the roots of the both-end supported plate parts 7*a* become the support member 2, and the tip parts may be constructed so as to be made close to or adhered to by an adhesive the facing wall 3. Further, the cantilever plate part 5 and the both-end supported plate part 7*a* can be integrally formed to make one continuous plate. Likewise, both-end supported plate parts 7*b* are formed in the downstream side of the measuring element 1 as well. It is preferable that the both-end supported plate parts 7*b* are of symmetric construction of the both-end supported plate parts 7*a* with the measuring element 1 as a center.

Further, guide parts 8 are arranged in the side faces of the both-end supported plate parts 7*a*, 7*b*. The guide parts 8 are formed by shaping grooves in the side faces of the both-end supported plate parts 7*a*, 7*b*. The guide parts 8 are shaped so as to head toward the facing wall side as they go close to the measuring element 1. Also, guide parts 8 are formed in the plural. The guide parts 8 can be formed in both sides of the both-end supported plate parts, but can be formed in one side only.

Figure 2:
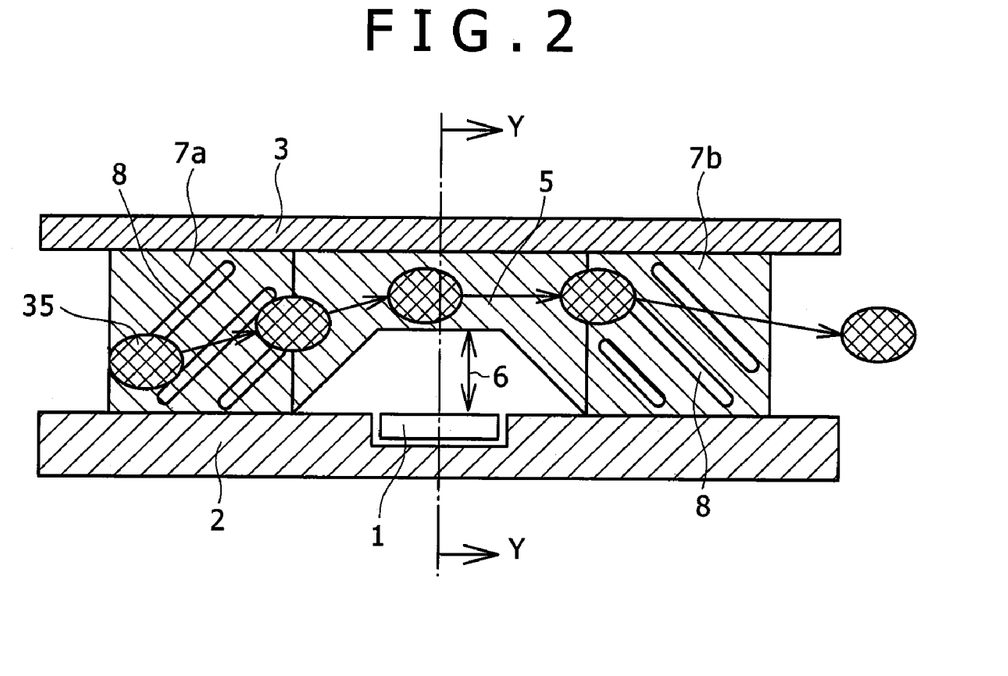
FIG. 2 is a drawing showing movement of the water droplets in the first embodiment.

Here, the effect of the present embodiment with respect to attachment of the water droplets will be described. FIG. 2 shows movement of the water droplets when the water droplets fly in from the upstream side in the present embodiment. In the drawing, if the water droplet 35 flies in from the upper stream, it collides and attaches with the both-end supported plate parts 7*a* in the upstream side. By the air flow, the droplet attached crawls along the side face of the both-end supported plate parts 7*a* and moves to the downstream side. At this time, by the guide parts 8 shaped in the side faces of the both-end supported plate parts 7*a*, the water droplet heads for the side of the wall facing the measuring element 1. Further, the droplet crawls along the side faces of the cantilever plate parts 5 and moves to the both-end supported plate parts 7*b* in the downstream side. Thus, the droplet is captured by the both-end supported plate parts 7*a*, 7*b* and the cantilever plate parts 5, and moves to the downstream side so as to avoid attachment to the measuring element 1.

Figure 3:
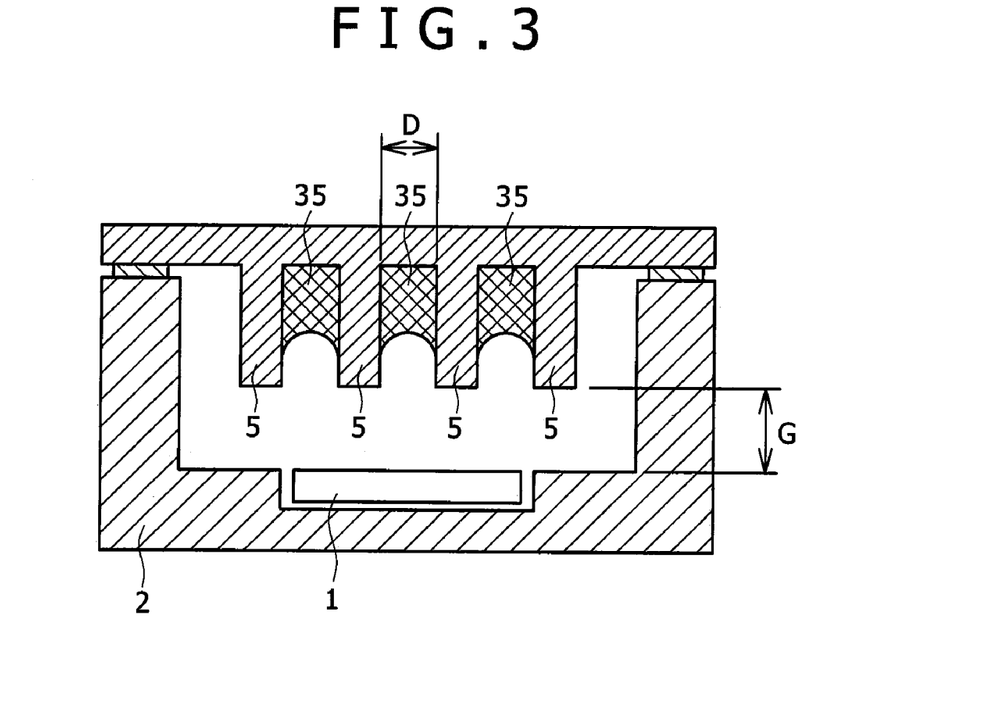
FIG. 3 is a drawing showing the state of the water droplets in the first embodiment.

FIG. 3 shows a cross-sectional view at Y-Y line in FIG. 2.

When a lot of many droplets fly in, water is possibly pulled in to a section of a gap G between the tip of the cantilever plate parts 5 and the surface of the measuring element 1 by a capillary phenomenon. As described above, the flowmeter is configured so that the relation between the interval D of the cantilever plate parts 5 and the gap G becomes D<G. With such configuration, the force of pulling water in of the gap G part is larger than that of D of the cantilever plate parts 5, and attachment to the measuring element 1 can be decreased more.

In the present embodiment, the cantilever plate part 5 and the both-end supported plate parts 7*a*, 7*b* are made one continuous plate, however, the cantilever plate part 5 and the both-end supported plate parts 7a, 7b can be shaped so that they are separate and the side faces of these plates become a generally continuous face. Also, although the both-end supported plate parts 7a, 7b are of the shape fixed to both wall faces, they can be of the constitution wherein they are fixed to either one of the wall face and a minute gap exists against the other wall face. Further, although the guide parts 8 are of the shape of arranging a plurality of grooves in parallel, they can be in any shape as far as being shaped in the side faces of the both-end supported plate parts 7a, 7b and of a shape guiding the attached water droplets to the facing wall side. In addition, although the guide parts 8 are shaped in the both-end supported plate parts 7a, 7b, they can be shaped in the side faces of the cantilever plate parts 5.

Next, the constitution and the measuring theory of the measuring element 1 will be described.

Figure 4:
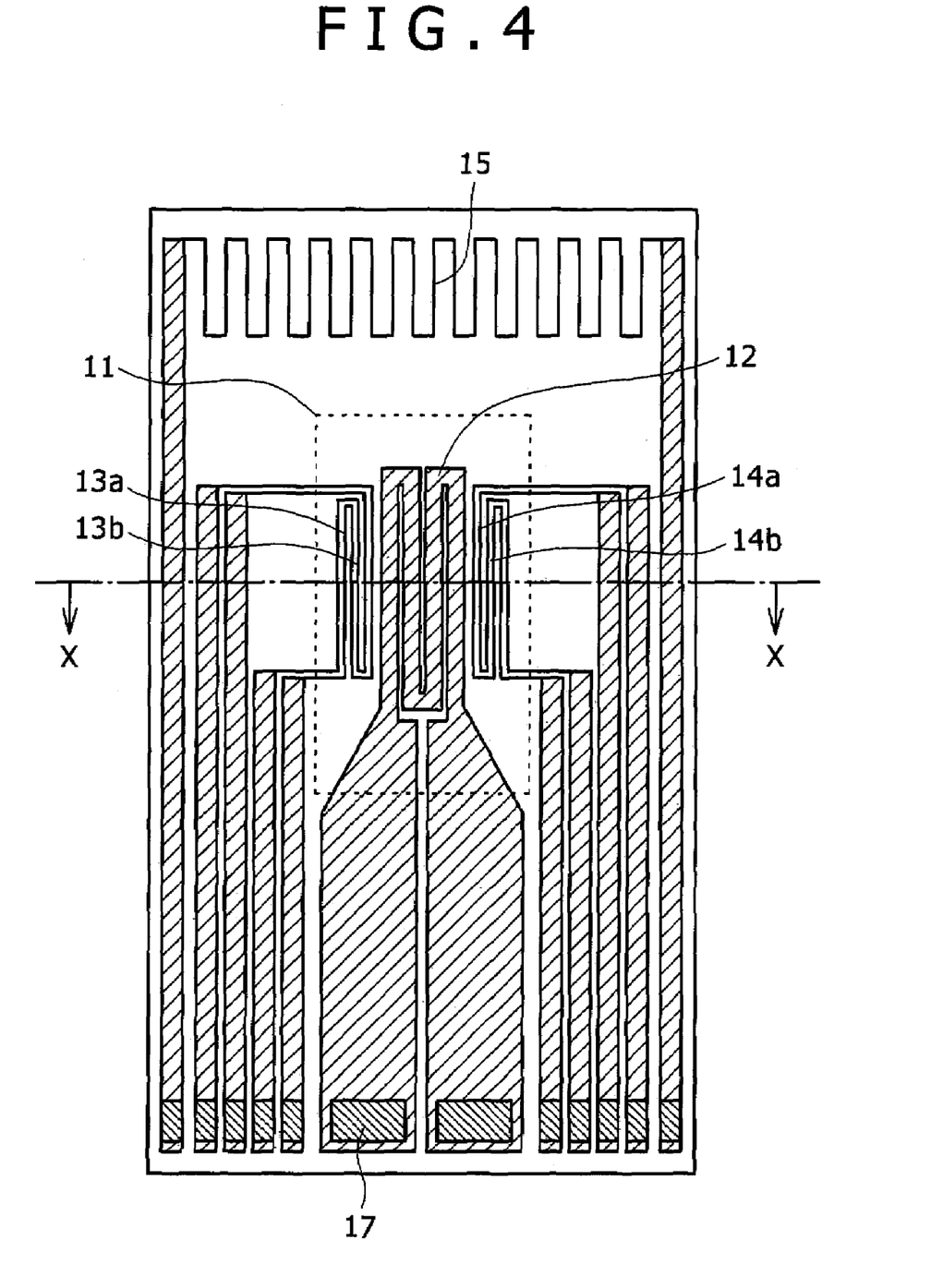
FIG. 4 is a drawing showing the measuring element in the first embodiment.

The constitution of the measuring element 1 of the thermal type flowmeter in accordance with the present embodiment will be described referring to FIG. 4. FIG. 4 is a plan view showing the measuring element 1. Also, FIG. 5 shows a cross-sectional view along X-X line in FIG. 4.

Figure 5:
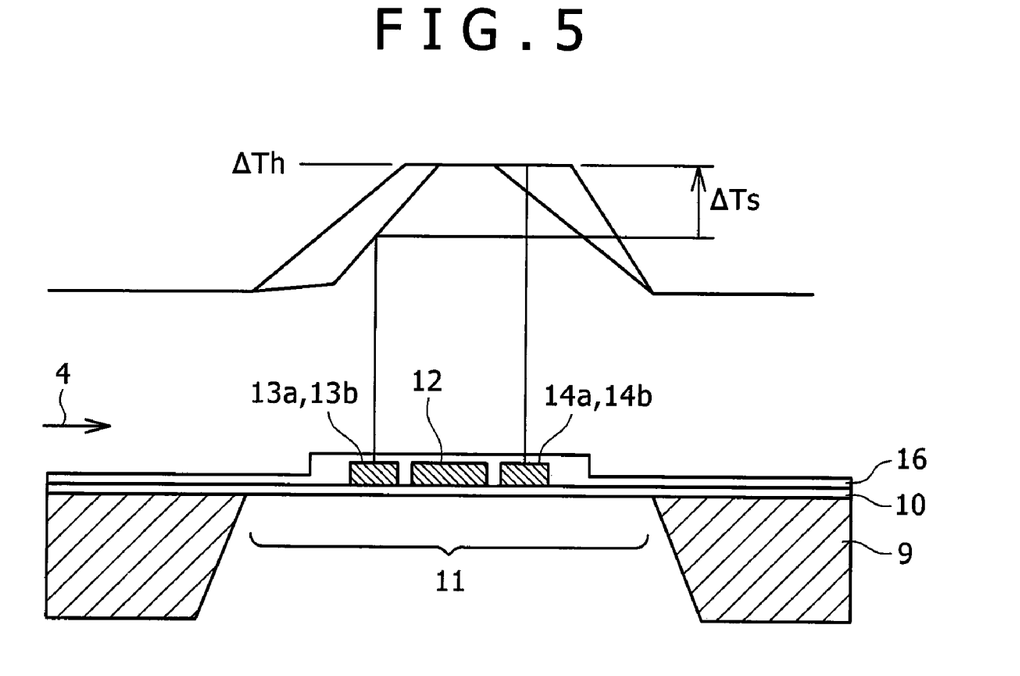
FIG. 5 is a drawing showing the section of the measuring element and the temperature distribution in the first embodiment.

In FIG. 4 and FIG. 5, a substrate 9 of the measuring element 1 is constituted of a material with excellent thermal conductivity ratio such as silicon and ceramic. Further, an insulation film 10 is formed on the substrate 9, and the substrate 9 is etched from the back side, thereby a diaphragm part 11 is shaped beneath the insulation film 10.

On the surface of the insulation film 10 on the diaphragm part 11, an exothermic resistor 12 is formed. The exothermic resistor 12 is heated so as to become hotter than the temperature of the air flow 4 by a prescribed temperature. In both sides of the exothermic resistor 12, temperature difference sensors 13a, 13b, 14a, 14b are formed. The temperature difference sensors 13a, 13b are arranged in the upstream side of the exothermic resistor 12, and the temperature difference sensors 14a, 14b are arranged in the downstream side of the exothermic resistor 12. Also, on the insulation film 10 in the outside of the diaphragm part 11, a heat sensitive resistor 15 whose resistance value changes according to the temperature of the air flow 4 is arranged. These resistors are protected by an insulation protection film 16.

It is preferable to form the exothermic resistor 12, the temperature difference sensors 13a, 13b, 14a, 14b, and the heat sensitive resistor 15 described above by a material with a comparatively large resistant temperature coefficient whose resistance value changes according to the temperature. Accordingly, they can be formed by a semiconductor material such as polycrystalline silicon and single-crystal silicon doped with impurities, and metallic materials such as platinum, molybdenum, tungsten, nickel alloy, and the like.

In the end part of the measuring element 1, an electrode pad 17 formed with aluminum or the like for taking out electrodes of the resistors described above and connecting to driving/detecting circuit is arranged.

Next, the measuring theory will be described. In FIG. 5, cross-sectional construction of the measuring element 1 and the distribution of the surface temperature of the measuring element 1 are shown simultaneously. The continuous line shows the temperature distribution of the diaphragm part 11 at the time of no wind. The exothermic resistor 12 is heated so as to become hotter than the temperature of the air flow 4 by ΔTh. The dotted line of FIG. 5 is the temperature distribution of the diaphragm part 11 when the air flow 4 occurs. By occurrence of the air flow, the upstream side of the exothermic resistor 12 is cooled by the air flow 4 and the temperature lowers, whereas in the downstream side, because the air which has passed by the exothermic resistor 12 and has been heated flows, thereby the temperature goes up. Consequently, by measuring the temperature of the upper stream and down stream of the exothermic resistor 12 by the temperature difference sensors 13a, 13b, 14a, 14b, the temperature difference ΔTs corresponding to the air flow rate is obtained.

Figure 6:
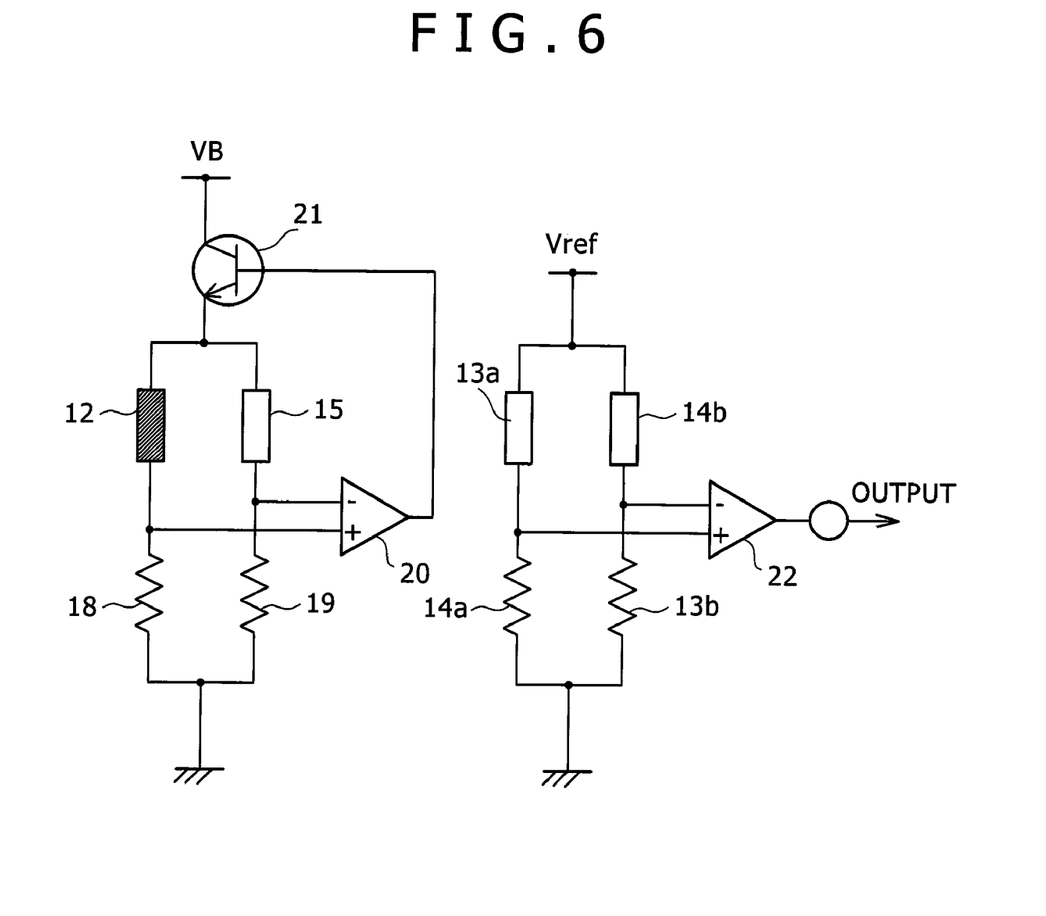
FIG. 6 is a drawing showing the driving/detecting circuit of the measuring element in the first embodiment.

Next, the driving/detecting circuit of the measuring element 1 will be described.

In FIG. 6, the driving/detecting circuit of the measuring element 1 is shown. A bridge circuit is constituted wherein a series circuit comprising the exothermic resistor 12 and a resistor 18 and a series circuit comprising the heat sensitive resistor 15 and a resistor 19 are connected in parallel. The differential voltage of the medium voltage of these series circuits is obtained and is connected to an amplifier 20. The output of the amplifier 20 is connected to the base of a transistor 21. The collector of the transistor 21 is connected to an electric source VB, and the emitter is connected between the exothermic resistor 12 and the heat sensitive resistor 15, thereby a feedback circuit is constituted.

The circuit described above controls so that the resistance balance of the bridge circuit is maintained. If the resistance value of the heat sensitive resistor 15 increases by the temperature rise of the air flow 4, electric current flows simultaneously and heats the exothermic resistor 12. Thus, the resistance balance between the heat sensitive resistor 15 and the exothermic resistor 12 is maintained constant. In other words, the heating temperature of the exothermic resistor against the air flow temperature is maintained constant.

Also, a bridge circuit is constituted connecting in parallel a series circuit comprising the temperature difference sensor 13a and the temperature difference sensor 14a and a series circuit comprising the temperature difference sensor 14b and the temperature difference sensor 13b, and is connected to a reference voltage Vref. When the temperature difference occurs between the temperature difference sensors 13a/13b and the temperature difference sensors 14a/14b by the air flow, the differential voltage of the bridge circuit changes which is detected by an amplifier 22, thereby the output in accordance with the air flow rate is obtained.

Figure 7:
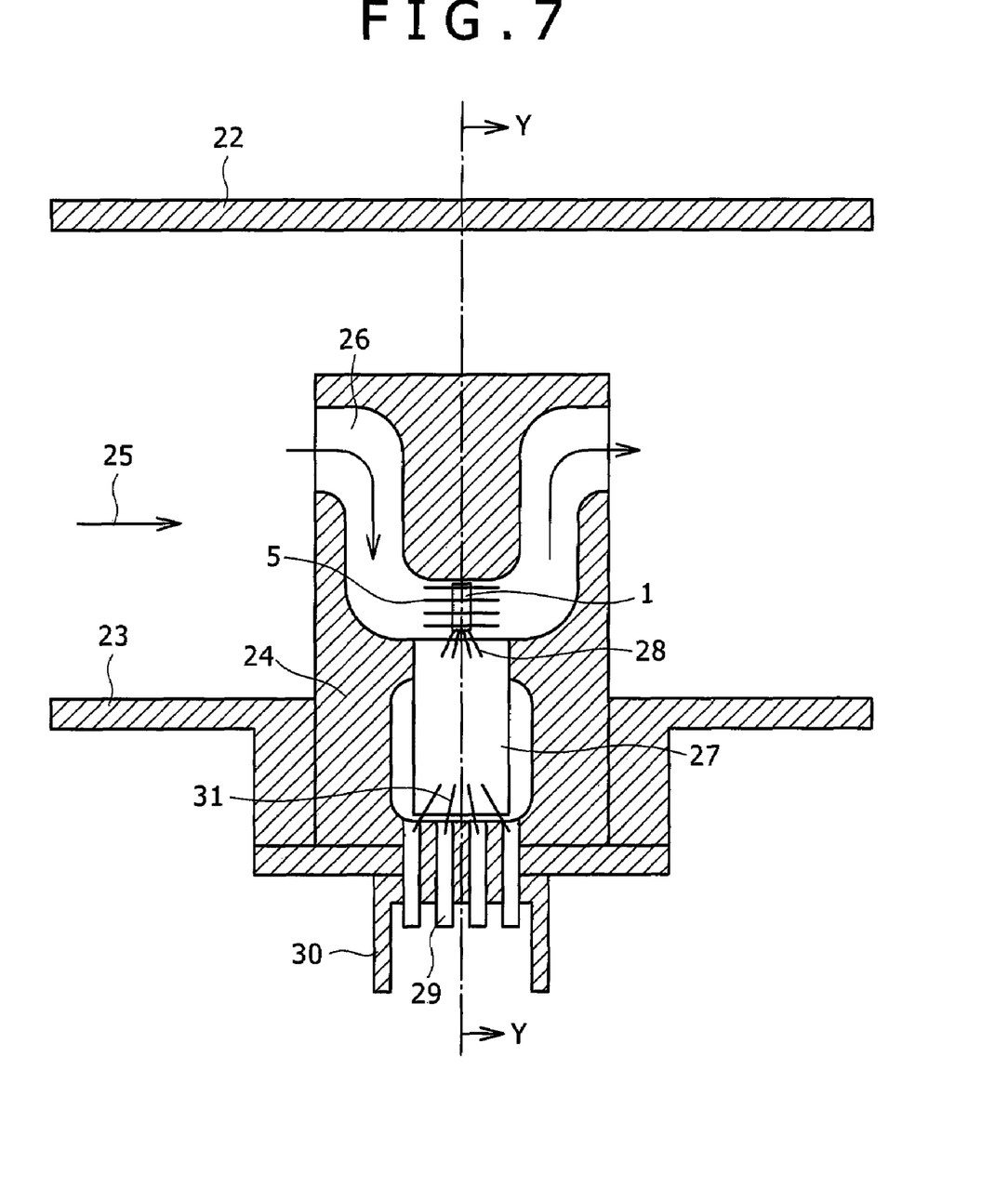
FIG. 7 is a construction drawing when the measuring element is arranged in an intake path in the first embodiment.

Next, the construction for attaching the measuring element 1 within an intake path of an internal combustion engine for an automobile and the like is shown in FIG. 7. In FIG. 7, a base member 24 is arranged so as to protrude from the wall face of an intake path 23. In the base member 24, a sub-passage 26 is shaped for taking in a portion of the air flow 25 within the intake path 23. In a rectangular recess shaped in the base member 24 within the sub-passage 26, the measuring element 1 is arranged. The channel of the sub-passage of the section where the measuring element 1 is arranged is straight, and its upstream side and downstream side are of a curved shape. Also, inside the base member 24, a circuit substrate 27 mounting the driving circuit described above is arranged, and is electrically connected to the measuring element 1 by gold wire bonding wires 28. Further, terminals 29 and a connector 30 for electricity supply of the driving circuit and extraction of the output signal are arranged, and are connected to the driving circuit by aluminum bonding wires 31.

Figure 8:
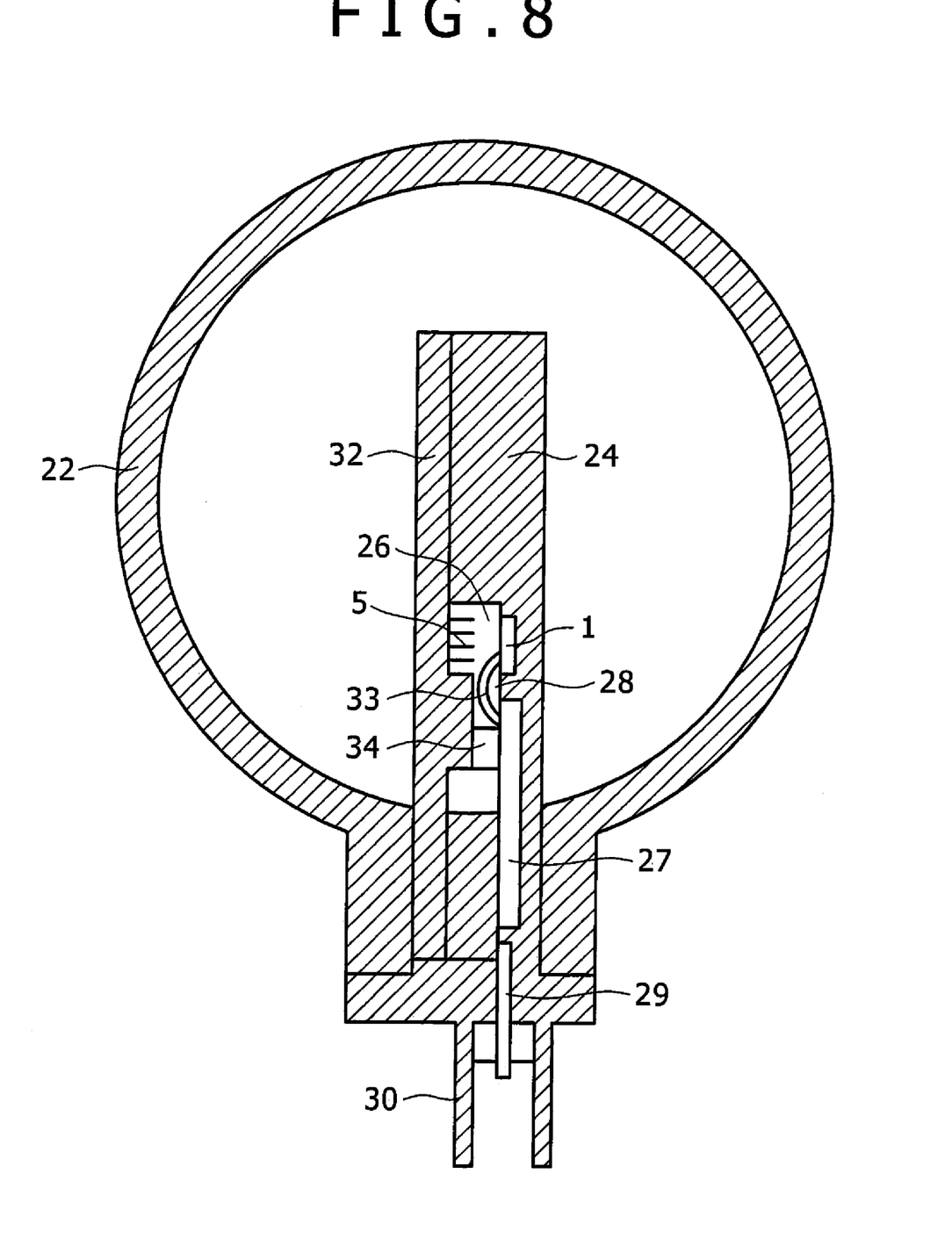
FIG. 8 is a drawing showing the cross-sectional view at Y-Y line in FIG. 7.

FIG. 8 shows a cross-sectional view at Y-Y line in FIG. 7. A cover member 32 is attached to the base member 24. The sub passage 26 is shaped so as to be sandwiched by the base member 24 and the cover member 32. The gold wire bonding wires 28 connecting the measuring element 1 and the driving circuit is protected by a sealant 33 such as epoxy. The cover member 32 and the base member 24 are adhered by a silicone adhesive and the like. Also, the cover member 32 and the circuit substrate 27 are adhered by the silicone adhesive to separate the air inside the sub-passage 26 for preventing leakage to the driving circuit side. The cantilever plate parts 5 described above are formed by shaping a plurality of projected plates in the section of the cover member 32 forming the sub-passage 26. The cantilever plate parts 5 are formed integrally with the cover member 32.

Second Embodiment

Next, the second embodiment will be described. In the explanation of the present embodiment, the points different from the above embodiment will be described.

Figure 9:
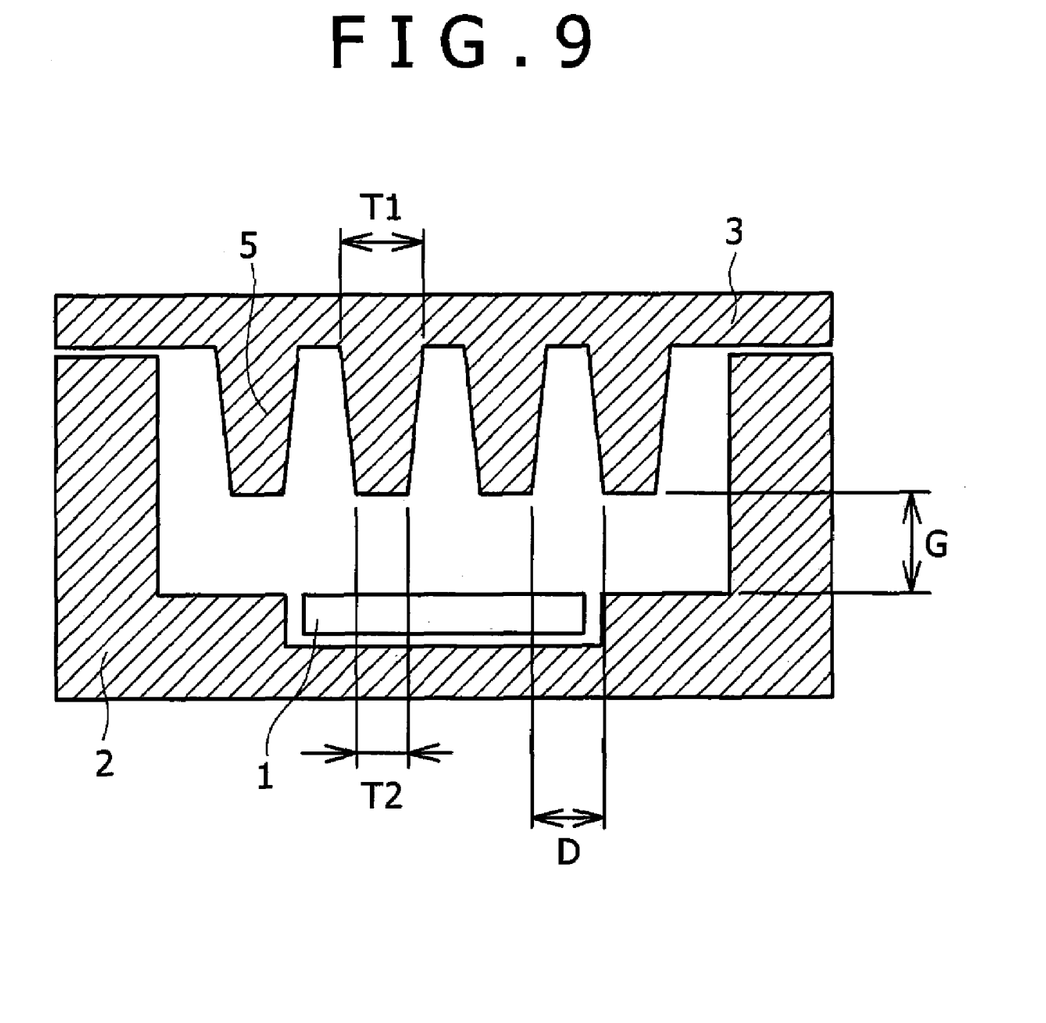
FIG. 9 is a cross-sectional view showing the periphery of the measuring element in the second embodiment.

In FIG. 9, a cross-sectional view around the measuring element 1 in the present embodiment is shown. The cantilever plate parts 5 formed facing to the measuring element 1 is shaped so that the thickness of the tip part T2 is thinner than the thickness of the roots T1. In other words, the sectional shape of the cantilever plate parts 5 is in the shape of trapezoid, triangle, or the shape approximate thereto. With such shape, the effect of pulling more the water droplets attached between the cantilever plate parts 5 to the facing wall side by a capillary phenomenon is obtained. Consequently, attachment of the water droplets to the measuring element 1 can be decreased further. In the present embodiment also, it is preferable that the relation of the interval D of the tip parts of a plurality of the cantilever plate parts 5 and the interval G between the cantilever plate parts 5 and the measuring element 1 becomes D<G. Further, with the shape described above, the mechanical strength of the cantilever plate parts 5 is enhanced.

Third Embodiment

Figure 10A:
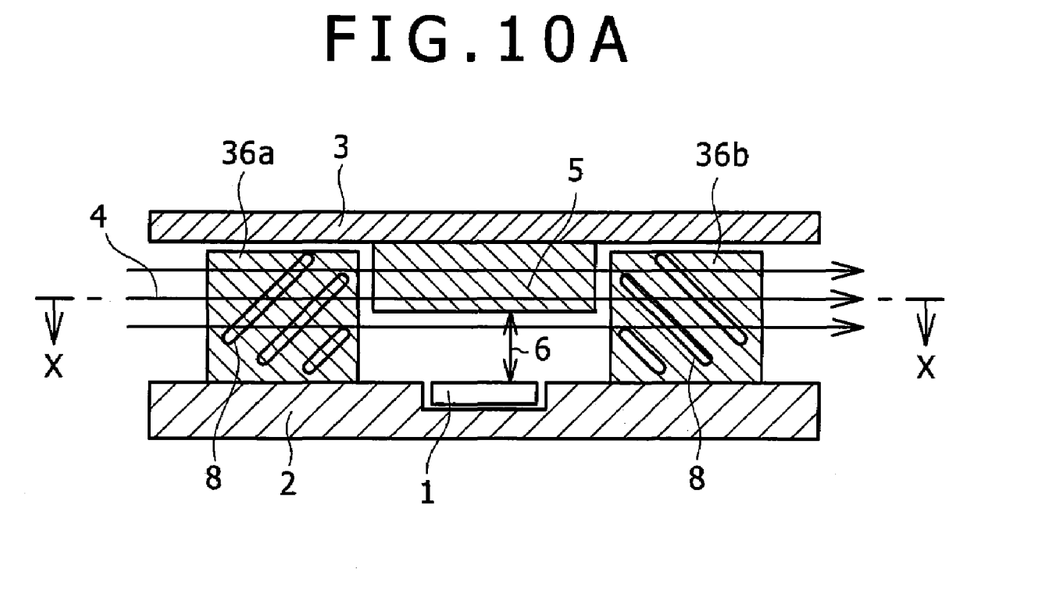
FIG. 10 is a drawing showing the periphery of the measuring element in the third embodiment.
Figure 10B:
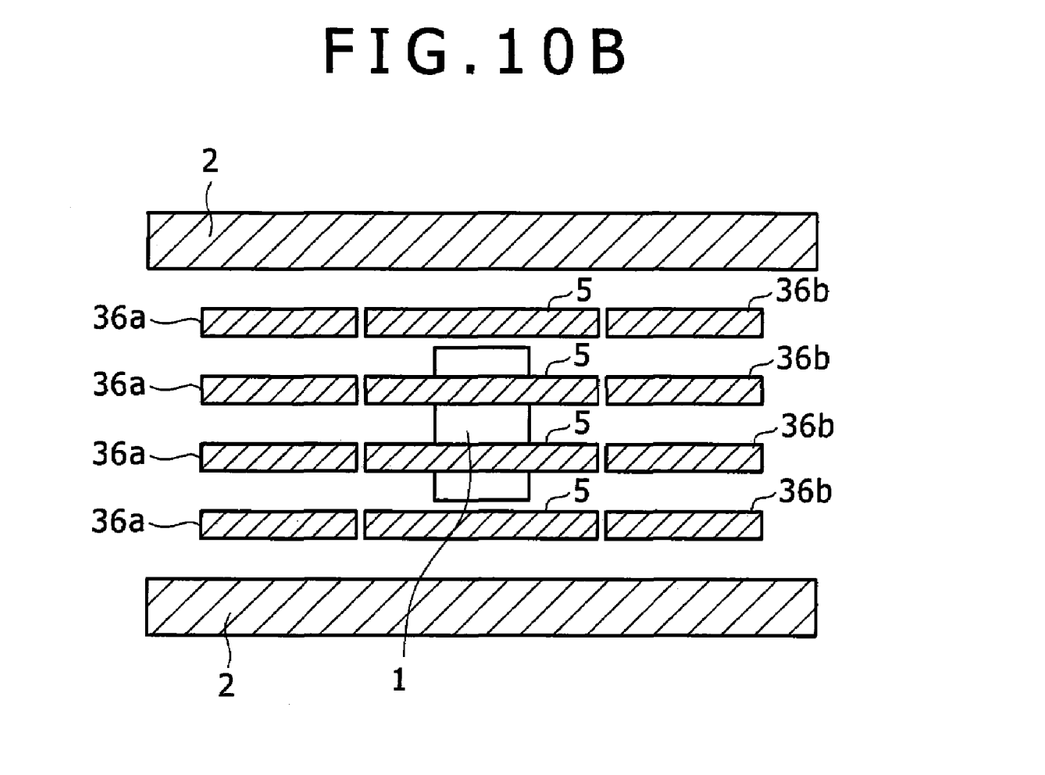

Next, the third embodiment will be described. In the explanation of the present embodiment, the points different from the above embodiments will be described. FIG. 10 (*a*) is a cross-sectional view of the section where the measuring element 1 is arranged. Also, FIG. 10 (*b*) is a cross-sectional view at X-X line in FIG. 10 (*a*). In FIG. 10 (*a*), the cantilever plate parts 5 protruding from the facing wall 3 are formed facing the measuring element 1, and in the upper stream and down stream of the measuring element 1, cantilever plate parts 36*a*, 36*b* protruding from the support member 2 in the side the measuring element 1 is arranged are disposed. These plates are arranged in the plural, the cantilever plate parts 5 and the cantilever plate parts 36*a*, 36*b* are adjacent with each other, and the side faces of them form a generally continuous same face. Further, in the side faces of the cantilever plate parts 36*a*, 36*b*, the guide parts 8 are shaped.

In such constitution, the water droplets attached to the cantilever plate parts 36*a* move to the facing wall side by the guide parts 8. Also, because the gaps between the cantilever plate parts 36*a* and the cantilever plate parts 5 are minute, the water droplets move to the cantilever plate parts 5. Further, the water droplets move to the cantilever plate parts 36*b*. Thus, even if the cantilever plate parts 5 and the cantilever plate parts 36*a*, 36*b* are separate, similar effect can be obtained by making them get close with each other.

The merit of the present embodiment will be described. In the first embodiment, with respect to the both-end supported plate parts 8*a*, 8*b* formed in the upstream side and downstream side of the measuring element 1, for supporting them in both ends, it was necessary to be adhered by an adhesive in the wall face of at least one side. In the present embodiment, because the cantilever plate parts 36*a*, 36*b* are in the cantilever construction, adhesion is not required and the manufacturing process is simplified.

Fourth Embodiment

Figure 11A:
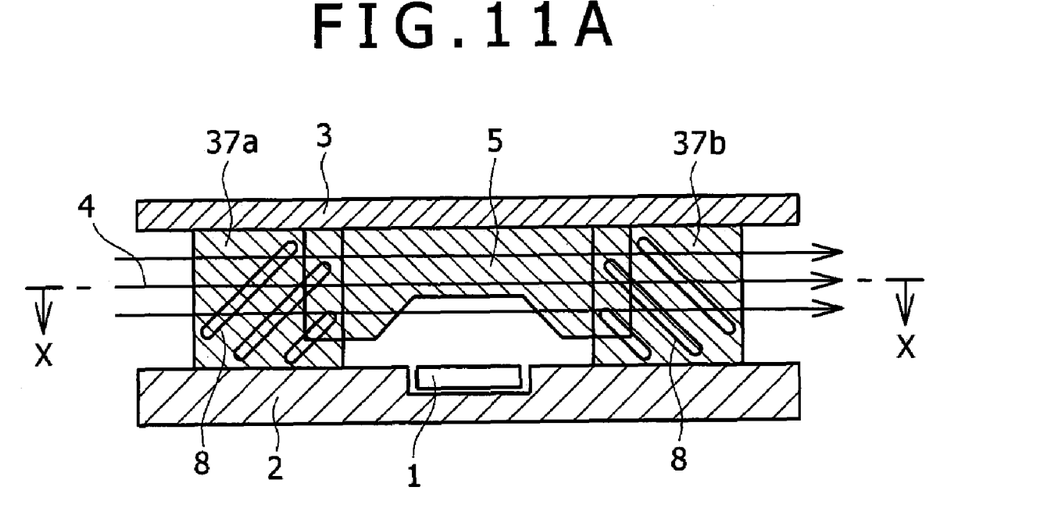
FIG. 11 is a drawing showing the periphery of the measuring element in the fourth embodiment.
Figure 11B:
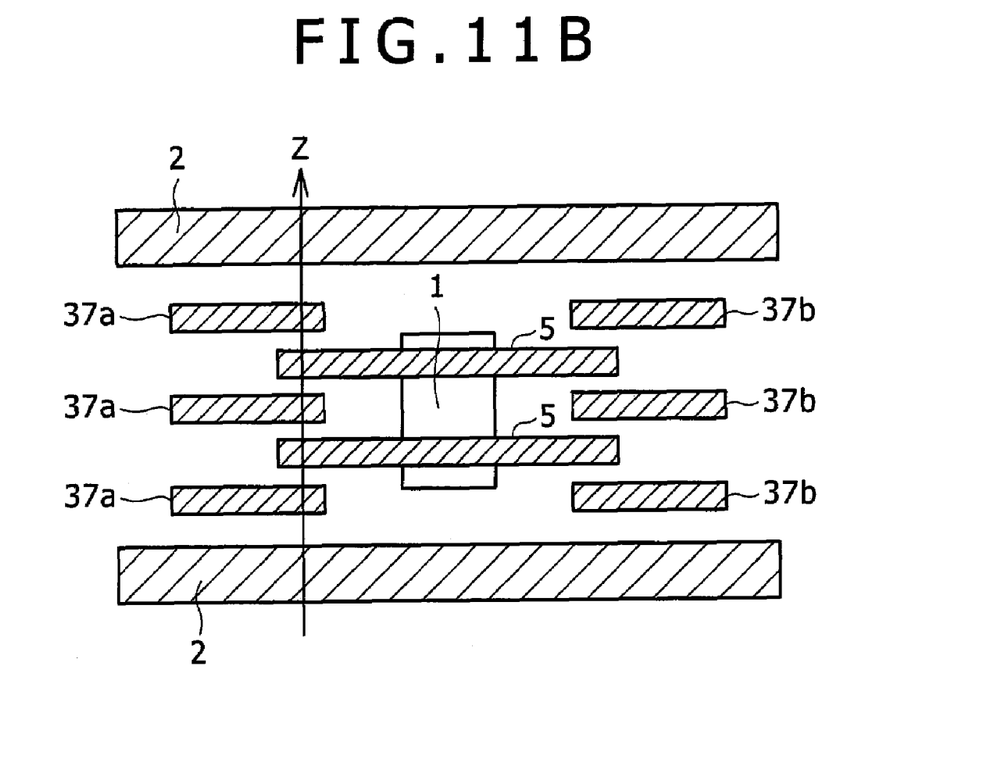

Next, the fourth embodiment will be described. In the explanation of the present embodiment, the points different from the above embodiments will be described. FIG. 11 (*a*) is a cross-sectional view of the section where the measuring element 1 is arranged. Also, FIG. 11 (*b*) is a cross-sectional view at X-X line in FIG. 11 (*a*). In FIG. 11, the cantilever plate parts 5 protruding from the facing wall 3 facing the measuring element 1 are arranged. In the upper stream and down stream of the measuring element 1, both-end supported plate parts 37*a*, 37*b* supported by the support member 2 in the side where the measuring element 1 is arranged and the facing wall 3 are formed. The positional relation of the cantilever plate parts 5 and the both-end supported plate parts 37*a*, 37*b* will be described referring to FIG. 11 (*b*). The cantilever plate parts 5 are arranged in the plural in the direction of the face of the measuring element 1 and in the direction perpendicular to the axis of the channel. The both-end supported plate parts 37*a*, 37*b* are also arranged in the plural in the same manner. Further, when viewed from Z direction in FIG. 11 (*b*), the cantilever plate parts 5 and the both-end supported plate parts 37*a* are alternately disposed so that they have portions overlapping with each other. With respect to the both-end supported plate parts 37*b*, the same. Furthermore, the guide parts 8 are arranged in the side faces of the both-end supported plate parts 37*a*, 37*b*.

In the constitution described above, the case wherein the water droplets fly in from the upstream side will be described. The water droplets that have flied in attach to the both-end supported plate parts 37*a*. The attached water droplets flow to the downstream side moving to the facing wall side by the guide parts 8 arranged in the side faces of the both-end supported plate parts 37*a*. In reaching the section where the both-end supported plate parts 37*a* and the cantilever plate parts 5 overlap, the water droplets attach to both side faces of the both-end supported plate parts 37*a* and the cantilever plate parts 5. Then, the water droplets separate from the both-end supported plate parts 37*a* and shift to the cantilever plate parts 5. The water droplets crawl along the side faces of the cantilever plate parts 5 and move to the downstream side. Thus, although the cantilever plate parts 5 and the both-end supported plate parts 37*a*, 37*b* are separate, attachment of the water droplets can be avoided.

The merit of the present embodiment will be described. In the present embodiment, because the cantilever plate parts 5 and the both-end supported plate parts 37*a*, 37*b* are disposed alternately, the number of the plates shaped can be decreased. Thus, the forming process of the cantilever plate parts 5 and the both-end supported plate parts 37*a*, 37*b* is simplified.

Although the both-end supported plate parts 37*a*, 37*b* in the present embodiment are of the construction supported by the support member 2 and the facing wall 3, they may be of the cantilever plates protruding from the support member 2.

Fifth Embodiment

Figure 12A:
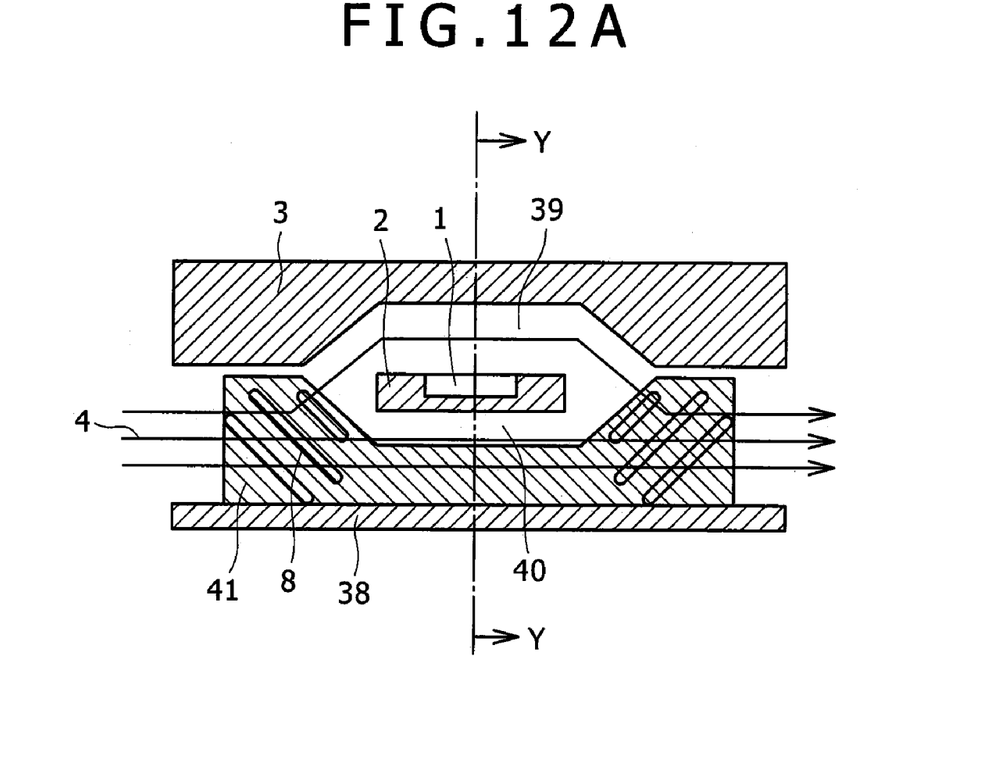
FIG. 12 is a drawing showing the periphery of the measuring element in the fifth embodiment.
Figure 12B:
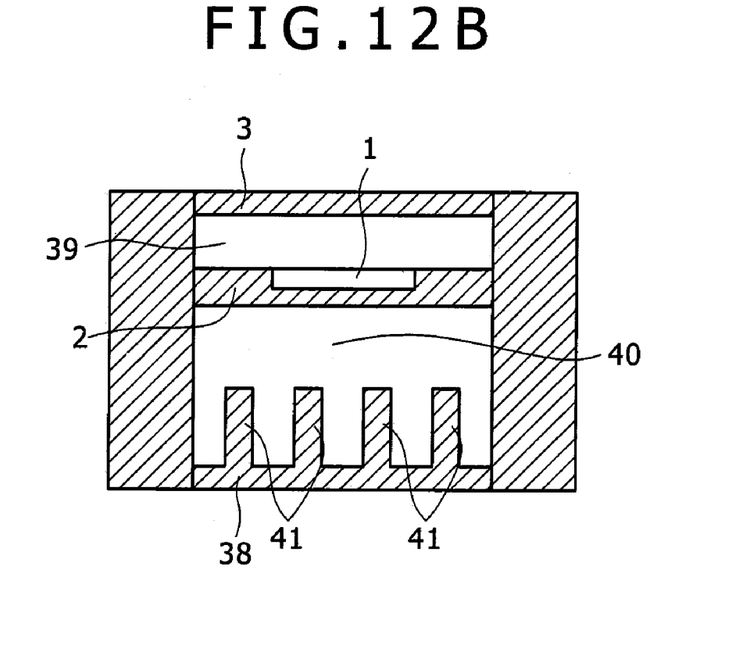

Next, the fifth embodiment will be described. In the explanation of the present embodiment, the points different from the above embodiments will be described. FIG. 12 (*a*) is a cross-sectional view of the section where the measuring element 1 is arranged. Also, FIG. 12 (*b*) is a cross-sectional view at X-X line in FIG. 12 (*a*). In FIG. 12 (*a*), FIG. 12 (*b*), the measuring element 1 is arranged in a rectangular recess shaped in the support member 2. Also, the support member 2 is arranged so as to float off the inner wall of the passage where the fluid flows. Further, the facing wall 3 is arranged so as to oppose to the face (surface) of the support member 2 where the measuring element 1 is disposed. In addition, a back side wall 38 is arranged in the back side of the support member 2. With this configuration, the channel diverges into a facial channel 39 for the flow in the facial side of the support member 2 and a back channel 40 for the flow in the back side of the support member 2. The channel diverged in the upstream side of the support member 2 is configured to join in the down stream of the support member 2.

In the channel configured as described above, cantilever plate parts 41 protruding from the back side wall are arranged in the plural, and are extended from the upper stream of the branch point of the channel described above to the downstream side of the merging point of the channel described above. Also, the cantilever plate parts 41 also in the upstream side of the branch point of the channel are shaped so as to be adjacent to or to be adhered to the facing wall 3. Further, in the cantilever plate parts 41 also in the downstream side of the merging point of the channel, they are shaped so as to be adjacent to or to be adhered to the facing wall 3. In addition, in the side face of the cantilever plate parts 41, the guide parts 8 heading to the back side wall 38 as they go close to the measuring element 1 are shaped. Furthermore, a gap is provided between the cantilever plate parts 41 and the support member 2.

In the constitution described above, the case wherein the water droplets fly in from the upstream side will be described. The water droplets that have flied in attach to the upstream side of the cantilever plate parts 41. The attached water droplets flow to the downstream side moving to the back side wall 38 side by the guide parts 8 arranged in the side faces of the cantilever plate parts 41. Then, the water droplets crawl along the side faces of the cantilever plate parts 41 and move to the downstream side. Thus, by shaping the cantilever plate parts 41, entering of the water droplets into the top channel 39 where the measuring element 1 is disposed can be prevented.

In accordance with the present invention, water droplets and liquid fouling matter flying in to the measuring element are trapped by plates shaped around the measuring element, crawl along the side faces of the plates so as to keep away from the measuring element and are made to flow to the down stream, thereby attaching to and contamination of the measuring element can be prevented, and highly accurate measurement of the flow rate becomes possible.

What is claimed is:

1. A thermal type flowmeter for measuring a flow rate by arranging a measuring element with an exothermic resistor and a temperature measuring resistor being shaped in the side of the surface of a substrate within a fluid passage, wherein;
    cantilever plate parts protruding from a wall face of the fluid passage opposing to the surface of the measuring element to the measuring element side are arranged,
    a gap is provided between the tip part of the cantilever plate parts in the protruding direction and the measuring element, and
    the cantilever plate parts are extended from the upper stream to the down stream of the measuring element.

2. The thermal type flowmeter as set forth in claim 1, wherein; the measuring element is supported by a support member opposing to the wall face,
    the support member is arranged so that channels where fluid flows are constituted respectively between a first wall face and the support member and between a second wall face opposing to the first wall face and the support member constituting the fluid passage and so that the measuring element opposes to the first wall face,
    the cantilever plate parts are made protrude from the second wall face toward the support member, the gap is provided between the tip part of the cantilever plate parts and the support member, and the cantilever plate parts are extended from the upper stream to the down stream of the support member.

3. The thermal type flowmeter as set forth in claim 1, wherein;
    the cantilever plate parts are shaped by arranging in the plural in the direction of the face of the measuring element and the direction generally perpendicular to the axis of the fluid channel.

4. The thermal type flowmeter as set forth in claim 1, wherein; plate-like parts are arranged extending from the wall face side to the measuring element side or the support member side beyond the tip part of the cantilever plate parts in the upstream side and the downstream side of the measuring element.

5. The thermal type flowmeter as set forth in claim 4, wherein; the plate-like parts constitute both-end supported plate parts supported by the wall face and the support member.

6. The thermal type flowmeter as set forth in claim 4, wherein; the cantilever plate parts and the plate-like parts form generally continuous faces.

7. The thermal type flowmeter as set forth in claim 5, wherein; guide parts of a projected or recessed shape which head from the measuring element side to the wall face side as they go close to the measuring element are shaped in the side faces of the plate-like parts.

8. The thermal type flowmeter as set forth in claim 2, wherein; guide parts of a projected or recessed shape which head from the support member side to the second wall face side as they go close to the support member are shaped in the side faces of the plate-like parts.

9. The thermal type flowmeter as set forth in claim 1, wherein; the plate thickness of the tip part of the cantilever plate parts is shaped thinner than the plate thickness of the roots.

10. The thermal type flowmeter as set forth in claim 3, wherein; when the interval from the tip part of the cantilever plate parts to the measuring element is made G and the interval between the tip parts of a plurality of the cantilever plate parts is made D, there is a portion wherein the relation between the interval G and the interval D becomes G>D.

11. The thermal type flowmeter as set forth in claim 1, wherein; the fluid passage shapes a sub-passage to which a portion of fluid of a main passage where the fluid to be measured flows is taken in, a straight part where a channel is straight and, in the upper stream and down stream of the straight part, curved parts where the channel is curved are provided within the sub-passage, and the measuring element is arranged in the straight part.

* * * * *